(12) United States Patent
Liu et al.

(10) Patent No.: US 12,436,437 B2
(45) Date of Patent: Oct. 7, 2025

(54) DISPLAY MODULE, DRIVING METHOD THEREOF, AND DISPLAY APPARATUS

(71) Applicants: Hefei BOE Optoelectronics Technology Co., Ltd., Anhui (CN); BOE TECHNOLOGY GROUP CO., LTD., Beijing (CN)

(72) Inventors: Yanni Liu, Beijing (CN); Hui Wang, Beijing (CN); Yang Xue, Beijing (CN); Sheng Wang, Beijing (CN); Junsheng Chen, Beijing (CN)

(73) Assignees: Hefei BOE Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/687,350

(22) PCT Filed: Jan. 20, 2023

(86) PCT No.: PCT/CN2023/073350
§ 371 (c)(1),
(2) Date: Feb. 28, 2024

(87) PCT Pub. No.: WO2024/152348
PCT Pub. Date: Jul. 25, 2024

(65) Prior Publication Data
US 2025/0123525 A1    Apr. 17, 2025

(51) Int. Cl.
*G02F 1/137* (2006.01)
*G02F 1/1335* (2006.01)

(52) U.S. Cl.
CPC .... *G02F 1/13718* (2013.01); *G02F 1/133512* (2013.01); *G02F 1/133514* (2013.01); *G02F 2203/02* (2013.01)

(58) Field of Classification Search
CPC .................................................. G02F 1/13718
See application file for complete search history.

(56) References Cited

U.S. PATENT DOCUMENTS

| | | | |
|---|---|---|---|
| 5,437,811 A * | 8/1995 | Doane | G02F 1/1334 349/86 |
| 5,748,277 A | 5/1998 | Huang et al. | |
| 2007/0109244 A1 | 5/2007 | Okada et al. | |

FOREIGN PATENT DOCUMENTS

| | | |
|---|---|---|
| CN | 1392441 A | 1/2003 |
| CN | 1510478 A | 7/2004 |

(Continued)

*Primary Examiner* — Joseph L Williams
(74) *Attorney, Agent, or Firm* — HOUTTEMAN LAW LLC

(57) ABSTRACT

A display module, including a first liquid crystal panel and a light modulation layer, where the first liquid crystal panel includes a first substrate and a second substrate opposite to each other, and a first liquid crystal layer between the first substrate and the second substrate; the light modulation layer is on a side of the second substrate away from the first substrate, and configured to reflect first colored light; and liquid crystal in the first liquid crystal layer is configured to present a planar texture state or a focal conic texture state in response to an action of an electric field, where the liquid crystal in the first liquid crystal layer presenting the planar texture state reflects second colored light with a color different from the first colored light, while the liquid crystal in the first liquid crystal layer presenting the focal conic texture state transmits light.

19 Claims, 4 Drawing Sheets

(56) References Cited

FOREIGN PATENT DOCUMENTS

| | | |
|---|---|---|
| CN | 101213485 A | 7/2008 |
| CN | 102540541 A | 7/2012 |
| CN | 104658490 A | 5/2015 |
| CN | 113703210 A | 11/2021 |
| JP | 2001166340 A | 6/2001 |

\* cited by examiner

DISPLAY MODULE, DRIVING METHOD THEREOF, AND DISPLAY APPARATUS

TECHNICAL FIELD

The present disclosure relates to the field of display technology, and specifically relates to a display module, a driving method thereof, and a display apparatus.

BACKGROUND

With the advance of the paperless progress, paper labels are gradually replaced with electronic display, which has the advantages of high reusability. In the field of electronic table signs, the requirements of a use scene can be generally satisfied by displaying two, three, or four colors. Current display panels in the existing art cannot satisfy the use requirements of both low power consumption and high color rendering at the same time.

SUMMARY

An embodiment of the present disclosure provides a display module, a driving method thereof and a display apparatus.

In a first aspect, an embodiment of the present disclosure provides a display module, including a first liquid crystal panel and a light modulation layer, wherein the first liquid crystal panel includes a first substrate and a second substrate opposite to each other, and a first liquid crystal layer between the first substrate and the second substrate;
the light modulation layer is on a side of the second substrate away from the first substrate, and configured to reflect first colored light; and
liquid crystal in the first liquid crystal layer is configured to present a planar texture state or a focal conic texture state in response to an action of an electric field, the liquid crystal in the first liquid crystal layer presenting the planar texture state reflects second colored light with a color different from a color of the first colored light, while the liquid crystal in the first liquid crystal layer presenting the focal conic texture state transmits light.

In some embodiments, the light modulation layer includes at least one colored ink layer configured to reflect the first colored light.

In some embodiments, the light modulation layer further includes a first black base on a side of a farthest colored ink layer from the second substrate away from the second substrate.

In some embodiments, the first black base is a black ink layer; and
the light modulation layer further includes a white ink layer between the farthest colored ink layer from the second substrate and the black ink layer.

In some embodiments, the light modulation layer includes a second liquid crystal panel;
the second liquid crystal panel includes a third substrate and a fourth substrate opposite to each other, and a second liquid crystal layer between the third substrate and the fourth substrate, and
liquid crystal in the second liquid crystal layer is configured to present a planar texture state or a focal conic texture state in response to the action of an electric field, the liquid crystal in the second liquid crystal layer presenting the planar texture state reflect the first colored light, and the liquid crystal in the second liquid crystal layer presenting the focal conic texture state transmits light.

In some embodiments, the light modulation layer further includes a second black base on a side of the second liquid crystal panel away from the first liquid crystal panel.

In some embodiments, the first liquid crystal layer and the second liquid crystal layer are each made of a material including cholesteric liquid crystal molecules and a chiral agent.

In some embodiments, the display module is divided into a plurality of subpixel regions arranged in an array;
the third substrate includes a third base substrate, and a first common electrode on a side of the third base substrate close to the second liquid crystal layer; and
the fourth substrate includes a fourth base substrate, and a plurality of second pixel units on a side of the fourth base substrate close to the second liquid crystal layer, the second pixel units are in one-to-one correspondence with the subpixel regions, and each second pixel unit includes a first pixel electrode in a corresponding subpixel region.

In some embodiments, a base substrate in the second liquid crystal panel close to the first liquid crystal panel, and a base substrate in the first liquid crystal panel close to the second liquid crystal panel, are the same base substrate.

In some embodiments, the display module is divided into a plurality of subpixel regions arranged in an array;
the first substrate includes a first base substrate, and a second common electrode on a side of the first base substrate close to the second liquid crystal layer; and
the second substrate includes a second base substrate, and a plurality of first pixel units on a side of the second base substrate close to the second liquid crystal layer, the first pixel units are in one-to-one correspondence with the subpixel regions, and each first pixel unit includes a second pixel electrode in a corresponding subpixel region.

In some embodiments, the first colored light and the second colored light are configured to be capable of being mixed into white light.

In some embodiments, the first colored light has a wavelength range of 610 nm to 650 nm; and
the second colored light has a wavelength range of 490 nm to 530 nm.

In some embodiments, the first colored light is red light, and the second colored light is cyan light.

In a second aspect, an embodiment of the present disclosure provides a method for driving a display module, wherein the method includes controlling liquid crystal in the first liquid crystal layer corresponding to a target subpixel region to present the focal conic texture state, including:
providing a first pulse to the second common electrode, and providing a second pulse to a second pixel electrode corresponding to the target subpixel region, so that the first liquid crystal layer presents a field-induced nematic state;
providing a reference voltage to the second common electrode, and providing the reference voltage to the second pixel electrode corresponding to the target subpixel region, so that the first liquid crystal layer presents the planar texture state; and
providing the reference voltage to the second common electrode, and providing a second pulse to the second pixel electrode corresponding to the target subpixel region, so that the first liquid crystal layer presents the focal conic texture state.

In some embodiments, the method further includes controlling liquid crystal in the first liquid crystal layer corresponding to the target subpixel region to present the planar texture state, including:

providing the first pulse to the first common electrode, and providing a second pulse to a first pixel electrode corresponding to the target subpixel region, so that the first liquid crystal layer presents the field-induced nematic state; and providing the reference voltage to the first common electrode, and providing the reference voltage to a first pixel electrode corresponding to the target subpixel region, so that the first liquid crystal layer presents a planar texture state.

In some embodiments, the first pulse and the second pulse have a same period and opposite phases.

In some embodiments, 1 to 60 first pulses are provided.

In some embodiments, the second pulse has a period of $\frac{1}{60}$ s to $\frac{1}{10}$ s.

In a third aspect, an embodiment of the present disclosure provides a display apparatus, including the display module according to the first aspect.

BRIEF DESCRIPTION OF DRAWINGS

Accompanying drawings are provided for further understanding of the present disclosure and constitute a part of the specification. Hereinafter, these drawings are intended to explain the present disclosure together with the following specific implementations, but should not be considered as a limitation on the present disclosure, in which.

Figure 1:
FIG. 1 is a schematic structural diagram of a display module according to an embodiment of the present disclosure.

LIST OF REFERENCE CHARACTERS first liquid crystal panel 1, light modulation layer 2;
first substrate 11: first base substrate 111, second common electrode 112; first liquid crystal layer 13; second substrate 12: second base substrate 121, second pixel electrode 122;
first colored ink layer 21, second colored ink layer 22, white ink layer 23, first black base 24;
second liquid crystal panel 3: third substrate 31, third base substrate 311, second liquid crystal layer 33, fourth substrate 32; and second black base 4.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation thereon.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. All other embodiments obtained by those of ordinary skill in the art based on the embodiments of the present disclosure described herein without paying any creative effort shall be included in the protection scope of the present disclosure.

Unless otherwise defined, technical or scientific terms used in the embodiments of the present disclosure are intended to have general meanings as understood by those of ordinary skill in the art to which the present disclosure belongs. The words "first", "second" and similar terms used in the present disclosure do not denote any order, quantity, or importance, but are used merely for distinguishing different components from each other. Likewise, the word "comprise" or "include" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", and the like are merely used to indicate a relative positional relationship, and when an absolute position of the described object is changed, the relative positional relationship may be changed accordingly.

With the advance of the paperless progress, paper labels are gradually replaced with electronic display, which has the advantages of high reusability. In the field of electronic table signs, the requirements of a use scene can be generally satisfied by displaying two, three, or four colors.

In the existing art, a liquid crystal display panel (LCD), an organic light-emitting display panel (OLED), a reflective liquid crystal display panel (RLCD), an electronic ink screen, or the like may be used as a conference table sign for display. During the conference, however, the LCD and the OLED can implement color display, but have high power consumption and need to be configured with a high-capacity battery; the RLCD has a low light reflectivity and poor color rendering, and cannot implement continued display after power break; and the electronic ink screen, although can implement low-power-consumption display, has low color rendering, and the display effect is not ideal.

To solve at least one of the above technical problems, an embodiment of the present disclosure provides a display module which can implement color display with better color rendering, while satisfying the requirement of low power consumption since there is no backlight.

Figure 2:
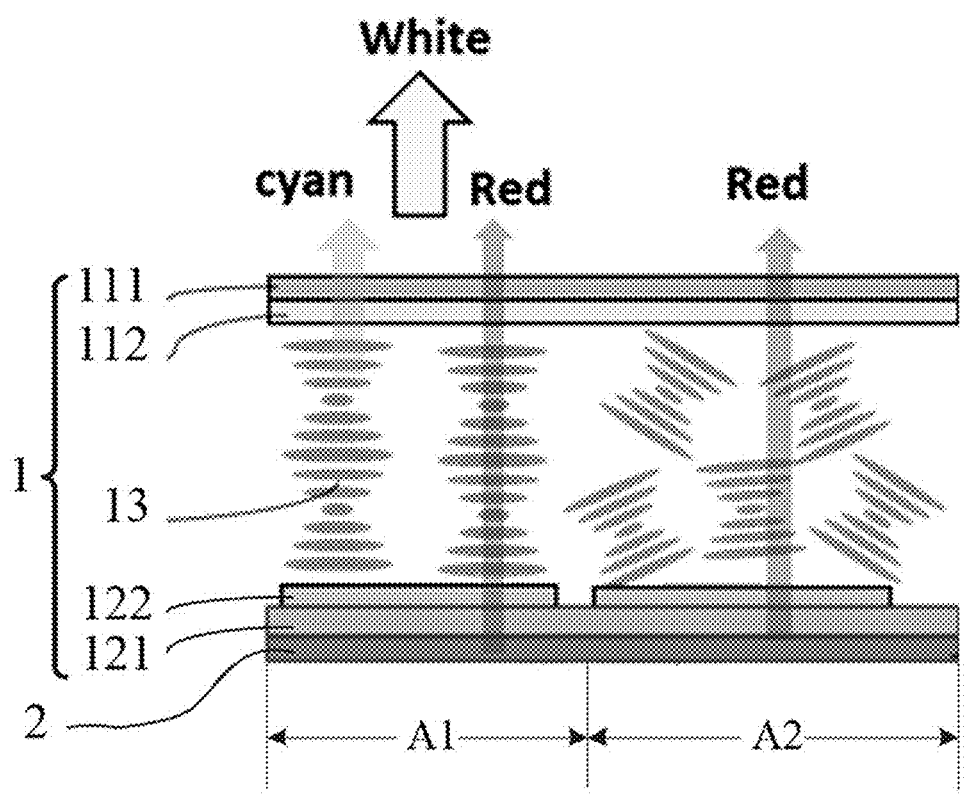
FIG. 2 is a schematic structural diagram of another display module according to an embodiment of the present disclosure.

FIG. 1 is a schematic structural diagram of a display module according to an embodiment of the present disclosure, and FIG. 2 is a schematic structural diagram of another display module according to an embodiment of the present disclosure. As shown in FIGS. 1 and 2, the display module includes a first liquid crystal panel 1 and a light modulation layer 2. The first liquid crystal panel 1 includes a first substrate 11 and a second substrate 12 opposite to each other, and a first liquid crystal layer 13 between the first substrate 11 and the second substrate 12.

The light modulation layer 2 is positioned on a side of the second substrate 12 away from the first substrate 11, and configured to reflect first colored light. Liquid crystal in the first liquid crystal layer 13 is configured to present a planar texture state or a focal conic texture state in response to the action of an electric field, the liquid crystal in the first liquid crystal layer 13 presenting the planar texture state reflects second colored light with a color different from the first colored light, while the liquid crystal in the first liquid crystal layer 13 presenting the focal conic texture state transmits light.

The display module provided in the embodiments of the present disclosure includes a first liquid crystal panel 1 and a light modulation layer 2, where the light modulation layer 2 can reflect a first colored light, and the first liquid crystal layer 13 in the first liquid crystal panel 1 has bistable characteristics so that the first liquid crystal layer 13 in the planar texture state can reflect a second colored light while transmitting the first colored light, and then, the display module can display a superimposed color of the first colored light and the second colored light; and the first liquid crystal layer 13 in a focal conic texture state only transmits the light, and then, the display module emits the first colored light and displays a first color. Compared with the solution in the existing art, the display module according to the embodiment of the present disclosure can implement color display, while the structure is simple and easy to manufacture, which is favorable to reducing the display power consumption as well as the manufacture cost.

In addition, in an embodiment of the present disclosure, the first liquid crystal layer 13 may include bistable cholesteric liquid crystal, which is a kind of chiral nematic liquid crystal that reflects light of a certain wavelength through a twisted liquid crystal layer, where the liquid crystal has a bistable function, and can maintain the picture after power break, thereby having a display characteristic of low power consumption.

In some embodiments, the display module is divided into a plurality of subpixel regions arranged in an array. The first substrate 11 includes a first base substrate 111, and a second common electrode 112 on a side of the first base substrate 111 close to the second liquid crystal layer 33. The second substrate 12 includes a second base substrate 121, and a plurality of first pixel units on a side of the second base substrate 121 close to the second liquid crystal layer 33. The first pixel units are in one-to-one correspondence with the subpixel regions, and each first pixel unit includes a second pixel electrode 122 in a corresponding subpixel region.

In addition, the first pixel unit further includes a first switch circuit including a first thin film transistor. The first thin film transistor has a control electrode connected to a first gate line, a first electrode connected to a first driving signal supply line, and a second electrode connected to the second pixel electrode 122.

It should be noted that for driving of the bistable cholesteric liquid crystal, due to the bistable nature of the liquid crystal, only an instantaneous voltage is applied to implement switching between states, and no sustaining voltage is needed to maintain each state, so that the pixel unit is not provided with a storage capacitor, and thus has a higher pixel aperture ratio.

The first thin film transistor controls electrical signals applied by the second common electrode 112 and the second pixel electrode 122, to adjust different states of the first liquid crystal layer 13. The specific control mode of the electrical signals is introduced in later embodiments, and thus is not described in detail here.

Specifically, the electrical signals applied by the second common electrode 112 and the second pixel electrode 122 can be controlled such that different electric fields are formed between the second common electrode 112 and the second pixel electrode 122, and depending on the loaded electric field, the first liquid crystal layer 13, i.e., the bistable cholesteric liquid crystal, presents different states. Depending on the applied electric field, the bistable cholesteric liquid crystal may present a planar texture state (P state), a focal conic texture state (FC state), or a homeotropic texture state (H state). The P state and the FC state are stable states, while the H state is an unstable state. The stable states can be maintained without voltage holding, while the unstable state only presents in a continuous power-on state.

When the bistable cholesteric liquid crystal presents the "P state", a spiral axis of the bistable cholesteric liquid crystal is substantially perpendicular to a plane where the first substrate 11 is located. In this case, the P-state cholesteric liquid crystal has a selective specular reflection characteristic, and specifically, the cholesteric liquid crystal follows the Bragg's law: $\lambda=n*p$, where n is an average refractive index of the cholesteric liquid crystal, $n=(no+ne)/2$, and p is a pitch of the cholesteric liquid crystal. The reflected wavelength width is $\Delta\lambda=\Delta n*p$, $\Delta n=ne-no$, where ne is an extraordinary refractive index of the cholesteric liquid crystal, no is an ordinary refractive index of the cholesteric liquid crystal, and given a fixed pitch of the cholesteric liquid crystal, light of a specific wavelength band corresponding to the pitch is reflected, so that a corresponding color is presented. As can be seen, the color of the light reflected by the cholesteric liquid crystal can be controlled by adjusting the pitch of the cholesteric liquid crystal (different colors of light are reflected at different pitches). When the bistable cholesteric liquid crystal presents the "FC state", the cholesteric liquid crystal in the FC state presents a multi-domain state, and although the helical structure in each domain can reflect light of a specific wavelength, the entire liquid crystal layer in the FC state is isotropic in terms of processing of the light, and will not reflect light of a specific wavelength.

In some embodiments, the first liquid crystal layer 13 may be made of a material including cholesteric liquid crystal molecules and a chiral agent. In specific implementations, the chiral agent functions to form a specific liquid crystal pitch, a concentration of the chiral agent is inversely proportional to the liquid crystal pitch, and light of a specific wavelength is reflected by adjusting the liquid crystal pitch.

In some embodiments, the material of the first liquid crystal layer 13 may further include a dye configured to cause a color change in the liquid crystal material. By adding a dye to the liquid crystal material, a color of the liquid crystal molecules is adjusted to be consistent with a color of the reflected light, thereby improving the saturation of the light reflected by the first liquid crystal layer 13.

As can be seen from the above analysis, the wavelength range of the light reflected by the first liquid crystal layer 13 in the planar texture state is determined by the pitch of the cholesteric liquid crystal, which is in turn controlled according to the concentration of the chiral agent in the material. In addition, when the first liquid crystal layer 13 is desired to reflect light with a higher color saturation, such as yellow light or orange light, in order to improve the display effect, a dye may be added to the first liquid crystal layer 13 to change the color of the liquid crystal molecules, thereby satisfying the color requirement of the reflected light.

In some embodiments, the first colored light and the second colored light are configured to be capable of being mixed into white light.

It should be noted that a colored light refers to light having a color other than an achromatic color (i.e., black, white, and gray) and having a certain hue, brightness, and saturation.

The display module provided in the embodiment of the present disclosure can form white light by mixing the second colored light reflected by the first liquid crystal panel 1 and the first colored light reflected by the light modulation layer 2. As can be seen, in the technical solution of the present disclosure, various colors of light are synthesized into white light without a backlight source; and color display of a high color gamut can be implemented without a color filter film. In addition, the cholesteric liquid crystal in the planar texture has a higher reflectivity (close to 50%) to light with a selected wavelength, so that the display module has a higher light utilization rate.

In some embodiments, the first colored light is red light, and the second colored light is cyan light.

In other embodiments, the first colored light and the second colored light may have other wavelength ranges, as along as the two colors are complementary to each other and can be mixed to form white light based on the metamerism color principle, which are not limited in the embodiments of the present disclosure.

It should be understood that when two colors of light on a same straight line in the chromaticity diagram are superimposed, any color on the straight line can be formed by controlling amounts of, and mixing, the two colors of light.

Figure 3:
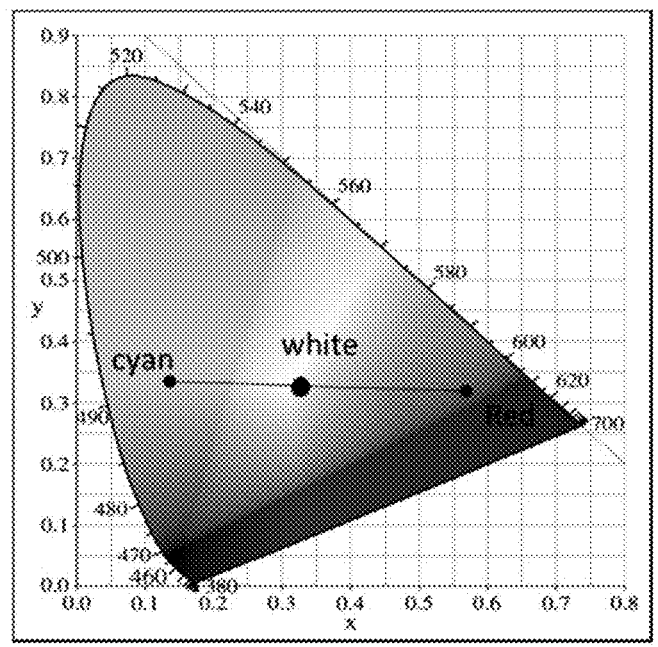
FIG. 3 is a 1931CIE-XYZ standard chromaticity system.

FIG. 3 is a 1931CIE-XYZ standard chromaticity system. The dotted triangle formed by XYZ in FIG. 3 covers the entire spectral locus, so that the entire spectral color becomes an in-gamut color in the gamut defined by the XYZ triangle, and the obtained spectral tristimulus values and chromaticity coordinates x, y, and z in the XYZ system will become positive values completely. As shown in FIG. 3, cyan and red can be superimposed and mixed into white, fine adjustment of chromaticity coordinates of the superimposed white can be implemented by controlling the amounts of cyan and red reflected light, and according to the requirements of the actual use scene, the superimposed white may be slightly cyan or red.

In some embodiments, the first colored light has a wavelength range of 610 nm to 650 nm; and the second colored light has a wavelength range of 490 nm to 530 nm.

Two implementations of the light modulation layer 2 will be described in detail below with reference to the drawings.

In some embodiments, as shown in FIG. 1, the light modulation layer 2 includes at least one colored ink layer configured to reflect the first colored light.

In one example, to increase the brightness of the first colored light, the colored ink layer has higher color rendering, in which case a plurality of colored ink layers may be provided. For example, the at least one colored ink layer may include a first colored ink layer 21 and a second colored ink layer 22. In the case where the first colored light is red light, the first colored ink layer 21 and the second colored ink layer 22 are both red ink layers.

To further increase the color gradation and depth of the light modulation layer 2, the light modulation layer 2 further includes a first black base 24 on a side of a farthest colored ink layer from the second substrate 12 away from the second substrate 12. The black base may include a black ink layer 24. In other words, a black ink layer is disposed below the colored ink layer to serve as a ground color, thereby improving color rendering of the colored ink layer.

In this case, to avoid color cross caused by the contact between the colored ink layer (i.e., the red ink layer) and the black ink layer, a white ink layer 23 is typically provided between the two ink layers. That is, the white ink layer 23 is located between the farthest colored ink layer from the second substrate 12 and the black ink layer.

Specifically, FIG. 2 illustrates colors of the light emitted from the display module in different states of the first liquid crystal panel 1 by taking subpixel regions A1 and A2 as an example. In the subpixel region A1, the first liquid crystal layer 13 in the planar texture state may reflect the second colored light, while the rest of light enters the light modulation layer 2, where the red ink layer reflects the first colored light, so that the display module may display a color of light mixed by the first colored light and the second colored light. In the subpixel region A2, the first liquid crystal layer 13 in the focal conic texture state transmits light to the light modulation layer 2, the red ink layer reflects the first colored light, while the rest light is absorbed, so that the display module may display a color corresponding to the first colored light.

In addition, in the manufacturing process of the display module, the first liquid crystal panel 1 may be provided first, and the first colored ink layer 21 and the second colored ink layer 22 are coated on a side of the second substrate 12 away from the first substrate 11, then the white ink layer 23 is further coated above the second colored ink layer 22, and finally, the first black base 24 is formed on the white ink layer 23, and the black ink layer is provided on a side of the first black base 24 facing the white ink layer 23.

In some embodiments, a sum of thicknesses of the first colored ink layer 21, the second colored ink layer 22, the white ink layer 23, and the black ink layer 24 may be 0.9 mm to 1.1 mm, where the thickness of each ink layer may be flexibly set according to actual requirements, and is not limited in the embodiments of the present disclosure.

Figure 4:
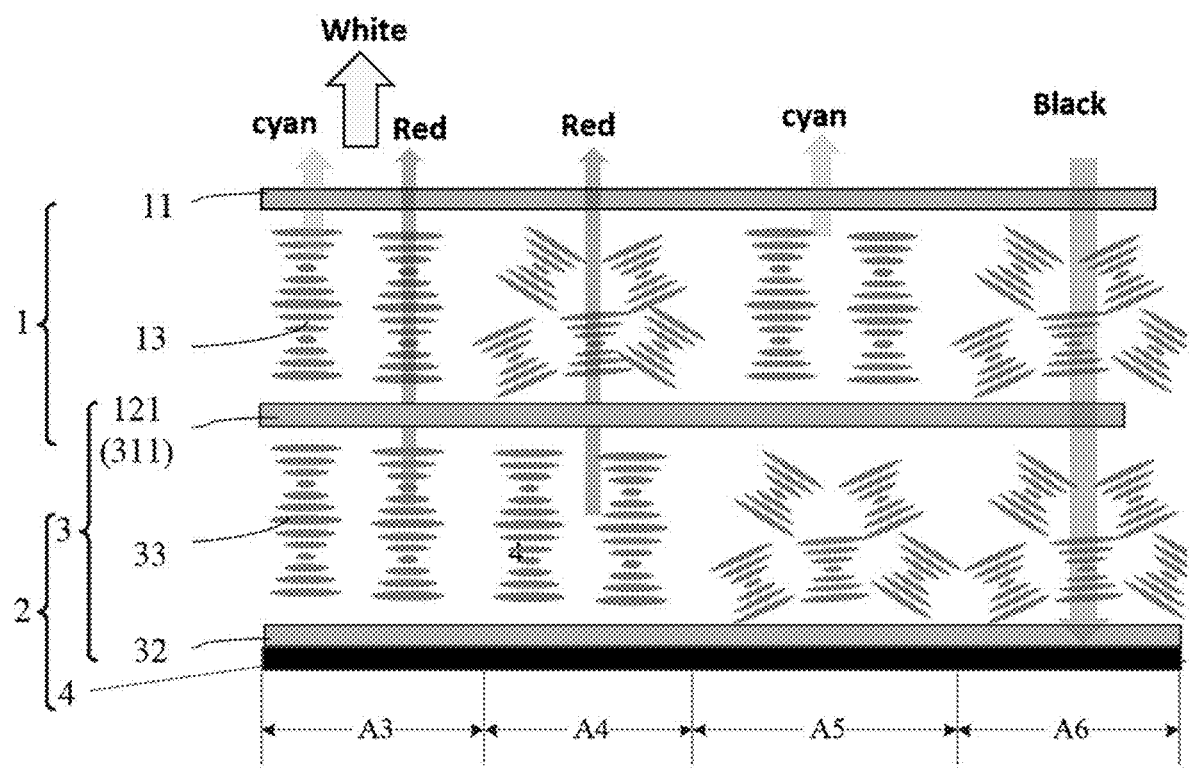
FIG. 4 is a schematic structural diagram of another display module according to an embodiment of the present disclosure.

FIG. 4 is a schematic structural diagram of another display module according to an embodiment of the present disclosure. As shown in FIG. 4, the light modulation layer 2 includes a second liquid crystal panel 3. The second liquid crystal panel 3 includes a third substrate 31 and a fourth substrate 32 opposite to each other, and a second liquid crystal layer 33 between the third substrate 31 and the fourth substrate 32. Liquid crystal in the second liquid crystal layer 33 is configured to present a planar texture state or a focal conic texture state in response to the action of an electric field, where the liquid crystal in the second liquid crystal layer 33 presenting the planar texture state reflects first colored light, and the liquid crystal in the second liquid crystal layer 33 presenting the focal conic texture state transmits light.

The characteristics of the second liquid crystal layer 33 in the planar texture state and the focal conic texture state are the same as those of the first liquid crystal layer 13, and thus are not repeated here.

In addition, the second liquid crystal layer 33 is made of a material including cholesteric liquid crystal molecules and a chiral agent, but it should be noted that the first liquid crystal layer 13 and the second liquid crystal layer 33 reflect light of different wavelength ranges. That is, the cholesteric liquid crystal in the first liquid crystal layer 13 has a different pitch from the cholesteric liquid crystal in the second liquid crystal layer 33. Further, the chiral agent added to the first liquid crystal layer 13 has a different concentration from the chiral agent added to the second liquid crystal layer 33.

As shown in the subpixel region A3 in FIG. 4, when the light modulation layer 2 includes the second liquid crystal panel 3, and the first liquid crystal panel 1 and the second liquid crystal panel 3 are both in the planar texture state, the first liquid crystal panel 1 reflects the second colored light, the second liquid crystal panel 3 reflects the first colored light, and the display module displays a superimposed color, i.e., white, of the first colored light and the second colored light.

In some embodiments, the light modulation layer 2 further includes a light absorption layer. The second liquid crystal panel 3 is located between the first liquid crystal panel 1 and the light absorption layer, and the light absorption layer is configured to absorb light other than that reflected by the second liquid crystal panel 3 in the light received by the light modulation layer 2.

In some embodiments, the light absorption layer includes a second black base 4 on a side of the second liquid crystal panel 3 away from the first liquid crystal panel 1. The second black base 4 may include a black ink layer, so that light reaching the second black base 4 after passing through the two liquid crystal panels is absorbed by the second black base 4.

Similar to the above embodiments, the first colored light may be cyan light, and the second colored light may be red light, so the display module may implement four-color (i.e., white, red, cyan, and black) display by controlling different states of the first liquid crystal layer 13 and the second liquid crystal layer 33.

Specifically, FIG. 4 illustrates colors of the light emitted from the display module in different states of the first liquid crystal panel 1 and the second liquid crystal panel 3 by taking subpixel regions A3 to A6 as an example. As shown in FIG. 4, in the subpixel region A3, the first liquid crystal panel 1 and the second liquid crystal panel 3 are both in the planar texture state, and the display module displays white. In the subpixel region A5, the first liquid crystal panel 1 is in the planar texture state, and the second liquid crystal panel 3 is in the focal conic texture state, so the first liquid crystal panel 1 reflects the second colored light, while the rest light enters the second liquid crystal panel 3 for transmission and is absorbed by the second black base 4 after reaching the second black base 4. In this case, the display module emits only the second colored light, that is, displays the color, i.e., cyan, corresponding to the second colored light. In the subpixel region A4, the first liquid crystal panel 1 is in the focal conic texture state, and the second liquid crystal panel 3 is in the planar texture state, so the first liquid crystal panel 1 transmits light to enable light of all wavelength ranges to enter the second liquid crystal panel 3, where the first colored light is reflected back to the first liquid crystal panel 1 and exits the display module after being transmitted by the first liquid crystal panel 1, while light of the other wavelength ranges is absorbed by the second black base 4 after reaching the second black base 4. In this case, the display module emits only the first colored light, that is, displays the color, i.e., red, corresponding to the second colored light. In the subpixel region A6, the first liquid crystal panel 1 and the second liquid crystal panel 3 are both in the focal conic texture state, and light transmitted by the two liquid crystal panels is absorbed by the first black base 24 after reaching the first black base 24. In this case, no light is emitted from the display module, and the display color is black.

In some embodiments, the display module is divided into a plurality of subpixel regions arranged in an array. The third substrate 31 includes a third base substrate 311, and a first common electrode (not shown) on a side of the third base substrate 311 close to the second liquid crystal layer 33. The fourth substrate 32 includes a fourth base substrate, and a plurality of second pixel units on a side of the fourth base substrate close to the second liquid crystal layer 33. The second pixel units are in one-to-one correspondence with the subpixel regions, and each second pixel unit includes a first pixel electrode (not shown) in a corresponding subpixel region.

The second pixel unit further includes a second switch circuit, which may include a second thin film transistor. The second thin film transistor has a control electrode connected to a second gate line, a first electrode connected to a second driving signal supply line, and a second electrode connected to the first pixel electrode.

It should be noted that the relative positions of the first substrate 11 and the second substrate 12 in the first liquid crystal panel 1 are not limited in the embodiments of the present disclosure. In other words, the first substrate 11 may be disposed on an emission side of the display module, and the second substrate 12 may be disposed on a non-emission side of the display module, or the first substrate 11 may be disposed on the non-emission side of the display module, and the second substrate 12 may be disposed on the emission side of the display module. Likewise, the relative positions of the third substrate 31 and the fourth substrate 32 in the second liquid crystal panel 3 are not limited.

On this basis, in some embodiments, a base substrate in the second liquid crystal panel 3 close to the first liquid crystal panel 1, and a base substrate in the first liquid crystal panel 1 close to the second liquid crystal panel 3, are the same base substrate.

Figure 5:
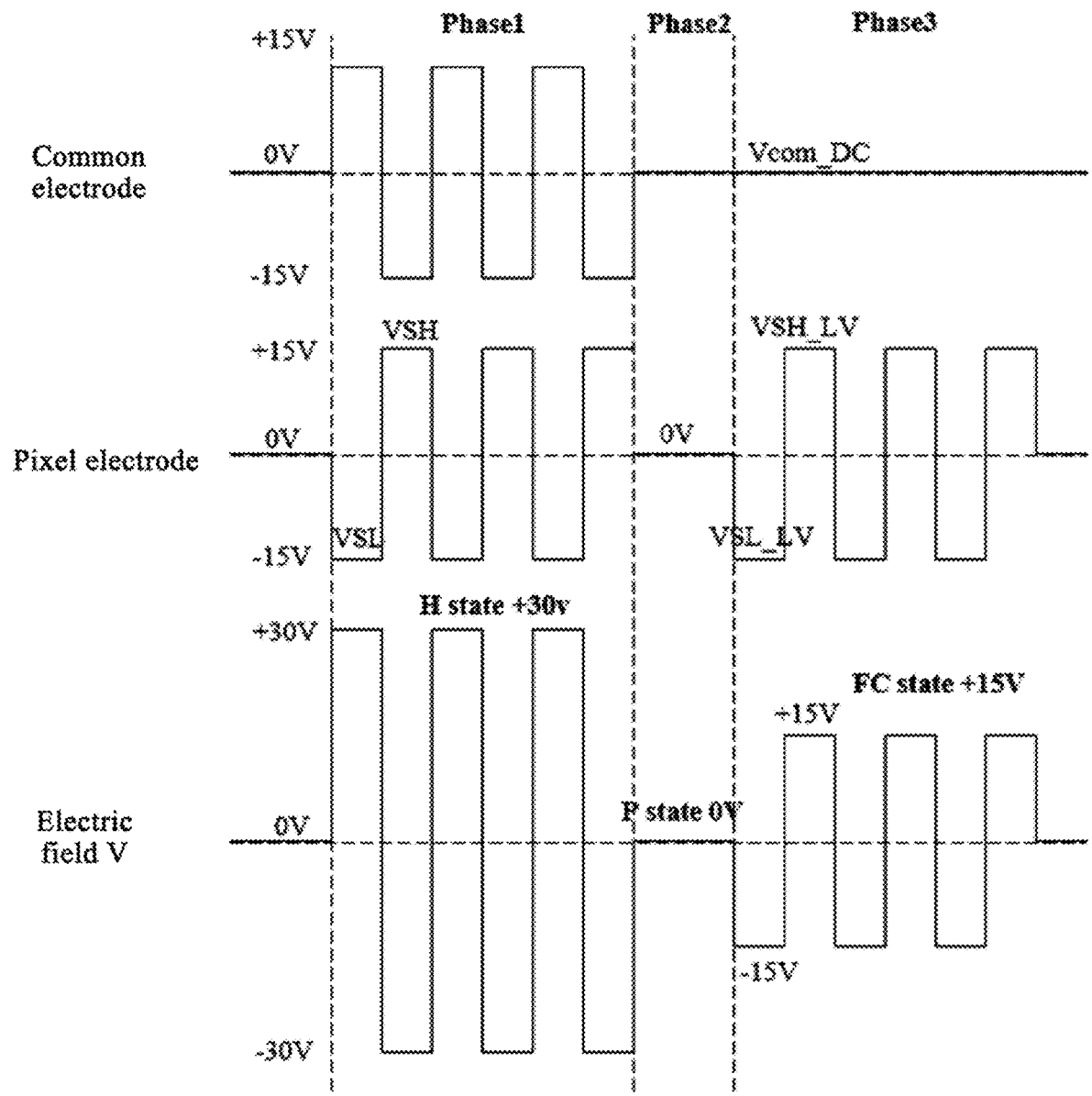
FIG. 5 is a schematic diagram of an electrical signal according to an embodiment of the present disclosure.

As one example, the display module shown in FIG. 5 includes a first base substrate 111, a second base substrate 121, a third base substrate 311, and a fourth base substrate from top to bottom, where the second base substrate 121 and the third base substrate 311 may be the same base substrate, so as to save the manufacturing process and cost of the display module while reducing the thickness of the display module.

In addition, each base substrate in the embodiments of the present disclosure may be a flexible substrate, such as resin, or may be a substrate with certain hardness, such as glass, which is not limited in the embodiments of the present disclosure.

It should be understood that when a third liquid crystal panel is further included in the display module, based on the same inventive concept as the first liquid crystal panel 1, the third liquid crystal panel may reflect a third colored light in the planar texture state, and transmit light in the focal conic texture state, so that the light entering the third liquid crystal panel is absorbed by the black ink layer on the non-emission side of the display module. In this case, the display module may display a color including any one of the first colored light, the second colored light or the third colored light, or may display a color mixed by any two of the three colored light, or may display a color mixed by the three to implement colorful display of the display module, while the power consumption and cost of the display module can still remain low.

If permissible by the manufacturing process, the number of liquid crystal panels in the display module can be flexibly set according to actual requirements, and more liquid crystal panels can display more colors, which is not limited in the embodiments of the present disclosure.

An embodiment of the present disclosure further provides a method for driving a display module. When the light modulation layer 2 in the display module includes the second liquid crystal panel 3, the method for controlling the first liquid crystal layer 13 in the first liquid crystal panel 1 is the same as the method for controlling the second liquid crystal layer 33 in the second liquid crystal panel 3, and the following takes the first liquid crystal panel 1 as an example to describe in detail switching processes of the first liquid crystal layer 13 in different states.

Figure 6:
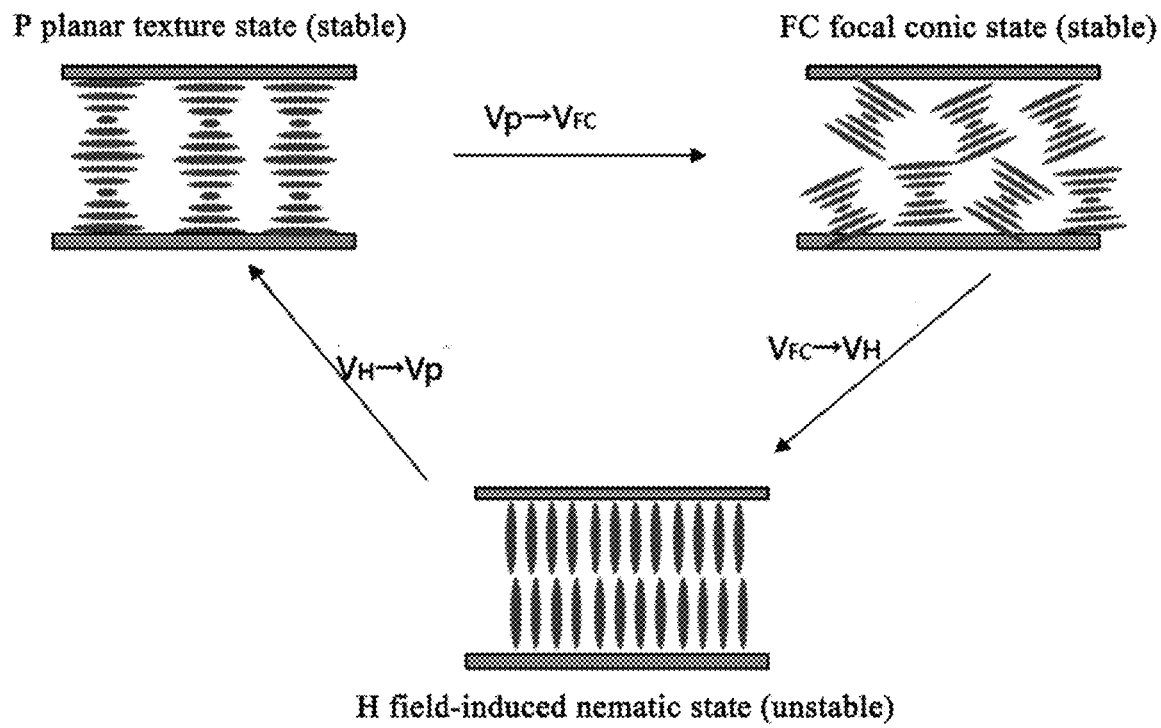
FIG. 6 is a schematic diagram showing a state of a first liquid crystal layer under the control of the electrical signal in FIG. 5.

FIG. 5 is a schematic diagram of an electrical signal according to an embodiment of the present disclosure, and FIG. 6 is a schematic diagram showing a state of a first liquid crystal layer 13 under the control of the electrical signal in FIG. 5. As shown in FIGS. 5 and 6, controlling liquid crystal in the first liquid crystal layer 13 corresponding to a target subpixel region to present a focal conic texture state, includes the following steps S1 to S3.

At step S1, providing a first pulse to the second common electrode 112, and providing a second pulse to a second pixel electrode 122 corresponding to the target subpixel region, so that the first liquid crystal layer 13 presents a field-induced nematic state.

In this case, in some embodiments, as shown in FIG. 5, the first pulse and the second pulse have the same period and opposite phases. In other words, pulses of the first pulse and the second pulse are alternated to form a voltage difference, so that a relatively large electric field is generated between the second common electrode 112 and the second pixel electrode 122, and under the action of the electric field, the first liquid crystal layer 13 is in an unstable state, i.e., the field-induced nematic state.

An input frequency for each of the first pulse and the second pulse may be preferably 10 HZ to 60 HZ, and a duration of the pulse signal is preferably 100 ms to 1000 ms. Accordingly, 1 to 60 first/second pulses are provided; and the first/second pulse has a period of $\frac{1}{60}$s to $\frac{1}{10}$s, which may be specifically adjusted according to the liquid crystal parameters and are not limited in the embodiments of the present disclosure.

At step S2, providing a reference voltage to the second common electrode 112, and providing the reference voltage to a second pixel electrode 122 corresponding to the target subpixel region, so that the first liquid crystal layer 13 presents a planar texture state.

In FIG. 5, a reference voltage of 0V is provided to each of the second common electrode 112 and the second pixel electrode 122. In other words, the first liquid crystal layer 13 can be switched from the H state to the P state by controlling the first pulse and the second pulse to be rapidly removed.

At step S3, providing the reference voltage to the second common electrode 112, and providing a second pulse to a second pixel electrode 122 corresponding to the target subpixel region, so that the first liquid crystal layer 13 presents a focal conic texture state.

The input frequency/number/period of the second pulse refers to that parameter in one of the field-induced nematic state or the focal conic texture state.

The focal conic texture state of the first liquid crystal layer 13 is converted from the planar texture state that is previously converted from the field-induced nematic state, and in the planar texture state, the reference voltage applied to each of the second common electrode 112 and the second pixel electrode 122 is a stable electric signal, so that signal jitter in the final focal conic texture state is avoided, and the signal stability is improved.

Meanwhile, the first liquid crystal panel is controlled in the above driving method, so that the high/low temperature reliability of the display module is ensured, and the display effect in a low-temperature environment is improved. For example, the picture quality of the display module in a low-temperature environment of −20° C. is improved, so that the display module can be applied to outdoor environments with a relatively large temperature difference.

In addition, to control liquid crystal in the first liquid crystal layer 13 corresponding to the target subpixel region to present a planar texture state, the above steps S1 and S2 are performed.

Figure 7:
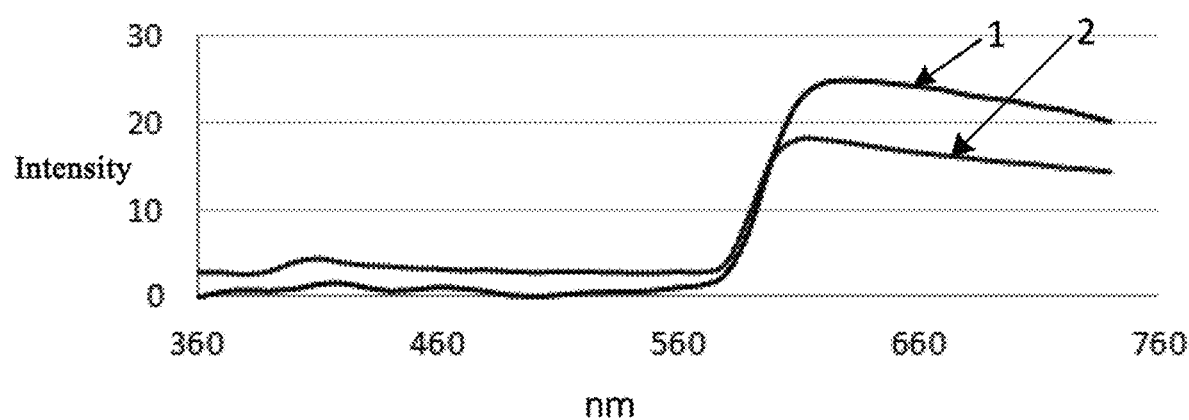
FIG. 7 shows relation curves of intensity with wavelength in a red spectrum for a display module according to an embodiment of the present disclosure and an electronic ink screen in a comparative example.

A comparative example is provided below for a parameter comparison with the display module shown in FIG. 2 according to an embodiment of the present disclosure. The comparative example may be an electronic ink screen. Based on tests, the comparative data in table 1 and table 2, and the relation curves shown in FIG. 7, can be obtained. FIG. 7 shows relation curves of intensity with wavelength in a red spectrum for a display module according to an embodiment of the present disclosure and an electronic ink screen in a comparative example.

TABLE 1

| Parameter | Comparative example | Embodiment of the present disclosure |
| --- | --- | --- |
| White picture reflectivity | 26.1% | 24.1% |
| Red picture reflectivity | 5.99% | 5.12% |
| Color coordinates of red picture | 0.483; 0.322 | 0.615; 0.324 |

Specifically, as can be seen from the data in table 1, compared with the electronic ink screen in the comparative example, the display module in the embodiment of the present disclosure has a relatively small difference in the light reflectivity when either the white picture or the red picture is displayed, while a difference in the picture brightness caused by a change of the reflectivity within 2% is negligible under the observation of human eyes. Therefore, the red color coordinate data of the display module in the embodiment of the present disclosure is obviously superior to that of the comparative example. In other words, the display module in the embodiment of the present disclosure has a display picture of a brighter color as well as higher color rendering.

As shown in FIG. 7, the curve 1 is a relation curve of the display module according to an embodiment of the present disclosure, and the curve 2 is a relation curve of the electronic ink screen according to the comparative example. When the display picture is red, the display module according to the embodiment of the present disclosure has a significantly higher light intensity than the comparative example. Therefore, compared with the comparative example, the display module according to the embodiment of the present disclosure can not only enable low power consumption bistable display, but also have a higher light intensity, which is beneficial to improving the display effect of the display module.

TABLE 2

| Parameter | Embodiment of the present disclosure | Electronic ink screen |
| --- | --- | --- |
| Peak current (mA) | 128.6 | 179.4 |
| Average current (mA) | 9.53 | 35.38 |
| Screen refresh time (s) | 5.36 | 35.6 |
| Power consumption (mA*s) | 51.08 | 1259.53 |

As can be seen from the data in table 2, an electrical signal for driving the display module to display a picture, that is, driving the first thin film transistor to control the first liquid crystal layer to be switched between different states in the embodiment of the present disclosure, is less than an electrical signal for driving the electronic ink screen to display. Meanwhile, the embodiment of the present disclosure has a picture refresh time far shorter than the electronic ink screen, and thus has a higher picture refreshing rate, and due to the higher refreshing rate, the display module has a much smaller overall power consumption than the electronic ink screen.

An embodiment of the present disclosure further provides a display apparatus including the display module as described above.

The display apparatus may be electronic paper, a mobile phone, a tablet, a television, a monitor, a laptop, a digital album, a navigator or any other product or component having a display function, which is not limited in the present disclosure.

It will be appreciated that the above implementations are merely exemplary implementations for the purpose of illustrating the principle of the present disclosure, and the present disclosure is not limited thereto. It will be apparent to those of ordinary skill in the art that various modifications and variations may be made without departing from the spirit or essence of the present disclosure. Such modifications and variations should also be considered as falling into the protection scope of the present disclosure.

What is claimed is:

1. A display module, comprising a first liquid crystal panel and a light modulation layer, wherein the first liquid crystal panel comprises a first substrate and a second substrate opposite to each other, and a first liquid crystal layer between the first substrate and the second substrate;
   the light modulation layer is on a side of the second substrate away from the first substrate, and configured to reflect first colored light; and
   liquid crystal in the first liquid crystal layer is configured to present a planar texture state or a focal conic texture state in response to an action of an electric field, wherein the liquid crystal in the first liquid crystal layer presenting the planar texture state reflects second colored light with a color different from a color of the first colored light, while the liquid crystal in the first liquid crystal layer presenting the focal conic texture state transmits light,
   wherein the first colored light and the second colored light are configured to be capable of being mixed into white light.

2. The display module according to claim 1, wherein the light modulation layer comprises at least one colored ink layer configured to reflect the first colored light.

3. The display module according to claim 2, wherein the light modulation layer further comprises a first black base on a side of a farthest colored ink layer from the second substrate away from the second substrate.

4. The display module according to claim 3, wherein the first black base is a black ink layer; and
   the light modulation layer further comprises a white ink layer between the farthest colored ink layer from the second substrate and the black ink layer.

5. The display module according to claim 1, wherein the light modulation layer comprises a second liquid crystal panel;
   the second liquid crystal panel comprises a third substrate and a fourth substrate opposite to each other, and a second liquid crystal layer between the third substrate and the fourth substrate, and
   liquid crystal in the second liquid crystal layer is configured to present a planar texture state or a focal conic texture state in response to an action of an electric field, the liquid crystal in the second liquid crystal layer presenting the planar texture state reflect the first colored light, and the liquid crystal in the second liquid crystal layer presenting the focal conic texture state transmits light.

6. The display module according to claim 5, wherein the light modulation layer further comprises a black base on a side of the second liquid crystal panel away from the first liquid crystal panel.

7. The display module according to claim 6, wherein the first liquid crystal layer and the second liquid crystal layer are each made of a material comprising cholesteric liquid crystal molecules and a chiral agent.

8. The display module according to claim 6, wherein the display module is divided into a plurality of subpixel regions arranged in an array;
   the third substrate comprises a third base substrate, and a first common electrode on a side of the third base substrate close to the second liquid crystal layer; and
   the fourth substrate comprises a fourth base substrate, and a plurality of second pixel units on a side of the fourth base substrate close to the second liquid crystal layer, the second pixel units are in one-to-one correspondence with the subpixel regions, and each second pixel unit comprises a first pixel electrode in a corresponding subpixel region.

9. The display module according to claim 5, wherein the first liquid crystal layer and the second liquid crystal layer are each made of a material comprising cholesteric liquid crystal molecules and a chiral agent.

10. The display module according to claim 5, wherein the display module is divided into a plurality of subpixel regions arranged in an array;
    the third substrate comprises a third base substrate, and a first common electrode on a side of the third base substrate close to the second liquid crystal layer; and
    the fourth substrate comprises a fourth base substrate, and a plurality of second pixel units on a side of the fourth base substrate close to the second liquid crystal layer, the second pixel units are in one-to-one correspondence with the subpixel regions, and each second pixel unit comprises a first pixel electrode in a corresponding subpixel region.

11. The display module according to claim 10, wherein a base substrate in the second liquid crystal panel close to the first liquid crystal panel, and a base substrate in the first liquid crystal panel close to the second liquid crystal panel, are a same base substrate.

12. The display module according to claim 1, wherein the display module is divided into a plurality of subpixel regions arranged in an array;
    the first substrate comprises a first base substrate, and a second common electrode on a side of the first base substrate close to the second liquid crystal layer; and
    the second substrate comprises a second base substrate, and a plurality of first pixel units on a side of the second base substrate close to the second liquid crystal layer, the first pixel units are in one-to-one correspondence with the subpixel regions, and each first pixel unit comprises a second pixel electrode in a corresponding subpixel region.

13. The display module according to claim 1, wherein the first colored light has a wavelength range of 610 nm to 650 nm; and the second colored light has a wavelength range of 490 nm to 530 nm.

14. The display module according to claim 1, wherein the first colored light is red light, and the second colored light is cyan light.

15. A display apparatus, comprising the display module according to claim 1.

16. A method for driving a display module, wherein the display module comprises a first liquid crystal panel and a light modulation layer, wherein the first liquid crystal panel comprises a first substrate and a second substrate opposite to each other, and a first liquid crystal layer between the first substrate and the second substrate;

the light modulation layer is on a side of the second substrate away from the first substrate, and configured to reflect first colored light; and liquid crystal in the first liquid crystal layer is configured to present a planar texture state or a focal conic texture state in response to an action of an electric field, wherein the liquid crystal in the first liquid crystal layer presenting the planar texture state reflects second colored light with a color different from a color of the first colored light, while the liquid crystal in the first liquid crystal layer presenting the focal conic texture state transmits light, wherein the display module is divided into a plurality of subpixel regions arranged in an array;

the first substrate comprises a first base substrate, and a second common electrode on a side of the first base substrate close to the second liquid crystal layer; and the second substrate comprises a second base substrate, and a plurality of first pixel units on a side of the second base substrate close to the second liquid crystal layer, the first pixel units are in one-to-one correspondence with the subpixel regions, and each first pixel unit comprises a second pixel electrode in a corresponding subpixel region, and the method comprises controlling liquid crystal in the first liquid crystal layer corresponding to a target subpixel region to present the focal conic texture state, comprising:

providing a first pulse to the second common electrode, and providing a second pulse to a second pixel electrode corresponding to the target subpixel region, so that the first liquid crystal layer presents a field-induced nematic state;

providing a reference voltage to the second common electrode, and providing the reference voltage to the second pixel electrode corresponding to the target subpixel region, so that the first liquid crystal layer presents the planar texture state; and providing the reference voltage to the second common electrode, and providing a second pulse to the second pixel electrode corresponding to the target subpixel region, so that the first liquid crystal layer presents the focal conic texture state, and the method further comprises controlling the liquid crystal in the first liquid crystal layer corresponding to the target subpixel region to present a planar texture state, comprising:

providing the first pulse to the second common electrode, and providing a second pulse to a second pixel electrode corresponding to the target subpixel region, so that the first liquid crystal layer presents the field-induced nematic state; and providing the reference voltage to the second common electrode, and providing the reference voltage to the second pixel electrode corresponding to the target subpixel region, so that the first liquid crystal layer presents the planar texture state.

17. The method according to claim 16, wherein the first pulse and the second pulse have a same period and opposite phases.

18. The method according to claim 16, wherein 1 to 60 first pulses are provided.

19. The method according to claim 16, wherein the second pulse has a period of $1/60$ s to $1/10$ s.

* * * * *